US011323511B2

(12) United States Patent
Boddam

(10) Patent No.: US 11,323,511 B2
(45) Date of Patent: May 3, 2022

(54) MIGRATING A NETWORK SERVICE TO A CONTAINER-BASED PLATFORM

(71) Applicant: T-Mobile USA, Inc., Bellevue, WA (US)

(72) Inventor: Linga Reddy Boddam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 184 days.

(21) Appl. No.: 16/509,984

(22) Filed: Jul. 12, 2019

(65) Prior Publication Data

US 2020/0329098 A1 Oct. 15, 2020

Related U.S. Application Data

(60) Provisional application No. 62/831,429, filed on Apr. 9, 2019.

(51) Int. Cl.
*H04L 29/08* (2006.01)
*G06F 9/455* (2018.01)
(Continued)

(52) U.S. Cl.
CPC ............ *H04L 67/1031* (2013.01); *G06F 8/63* (2013.01); *G06F 9/45558* (2013.01);
(Continued)

(58) Field of Classification Search
CPC ......... G06F 2009/4557; G06F 9/45558; G06F 2009/45562; G06F 2009/45575;
(Continued)

(56) References Cited

U.S. PATENT DOCUMENTS

| 2014/0379901 | A1* | 12/2014 | Tseitlin | H04L 41/5096 709/224 |
| 2020/0112487 | A1* | 4/2020 | Inamdar | H04L 41/082 |
| 2020/0117576 | A1* | 4/2020 | Karukuri | G06F 11/3664 |

FOREIGN PATENT DOCUMENTS

EP        3245596 B1 *  8/2020  ......... H04L 65/1069

OTHER PUBLICATIONS

Brown, Kyle, "Apply the Strangler Application pattern to microservices applications", Feb. 13, 2017, https://developer.ibm.com/depmodels/microservices/articles/cl-strangler-application-pattern-microservices-apps-trs/(Year: 2017).*

(Continued)

*Primary Examiner* — Gregory G Todd
(74) *Attorney, Agent, or Firm* — Lee & Hayes, P.C.

(57) ABSTRACT

A network service may be supported by a software application that is executed by multiple computer servers, such as servers that are maintained as part of a server pool. To migrate to a container-based platform, the software application is containerized to create a container image. A container cluster is then created based on the container image. The container cluster includes one or more executing containers, each of which performs the functions of the software application. The container cluster is then added as a member of the server pool to receive a portion of any network requests for the network service. Computer servers of the server pool may then be removed gradually, over time, to let the container cluster gradually assume responsibility for responding to network requests.

20 Claims, 3 Drawing Sheets

(51) Int. Cl.
  *G06F 8/61* (2018.01)
  *G06F 11/36* (2006.01)
  *H04L 67/1031* (2022.01)
  *H04L 67/1023* (2022.01)
  *H04L 67/1025* (2022.01)
  *H04L 67/1038* (2022.01)

(52) U.S. Cl.
  CPC ........ *G06F 11/368* (2013.01); *G06F 11/3692* (2013.01); *H04L 67/1023* (2013.01); *H04L 67/1025* (2013.01); *H04L 67/1038* (2013.01); *G06F 2009/4557* (2013.01); *G06F 2009/45562* (2013.01); *G06F 2009/45575* (2013.01)

(58) Field of Classification Search
  CPC ...... G06F 11/368; G06F 11/3692; G06F 8/63; H04L 67/1031; H04L 67/1025; H04L 67/1038; H04L 67/1023
  See application file for complete search history.

(56) References Cited

OTHER PUBLICATIONS

Fowler, Martin, StranglerFigApplication, Jun. 29, 2004, https://martinfowler.com/bliki/StranglerFigApplication.html (Year: 2004).*
Hewland, Jamie, Evolving our container load-balancers, Feb. 6, 2018, Medium (Year: 2018).*
Hammanr, Paul, Legacy Application Strangulation: Case Studies, Jul. 14, 2013, Paul Hammant's Blog (Year: 2013).*
Fowler, Martin, "Strangler Pattern," retrieved on Jul. 9, 2019, at <<https://docs.microsoft.com/en-us/azure/architecture/patterns/strangler>>, Published Jun. 22, 2017, pp. 1-2.

* cited by examiner

MIGRATING A NETWORK SERVICE TO A CONTAINER-BASED PLATFORM

CROSS-REFERENCE TO RELATED APPLICATION

This application claims priority to a commonly owned U.S. Provisional Patent Application No. 62/831,429 filed on Apr. 9, 2019, and titled "Digital Torque Transformation," which is herein incorporated by reference in its entirety.

BACKGROUND

A network service may often be implemented or supported by multiple servers of a server pool, where each server is a computer that runs one or more instances of a software application. Received network requests are routed to the individual servers for processing. For example, a load balancing router may be used to receive network requests and to provide them to different servers. The load balancing router may be configured by providing the network addresses of the servers of the server pool. When a request is received, it is forwarded to one of these addresses.

Additional servers can be added to the server pool as demand for the network service increases. However, adding servers is typically a manual process of installing and configuring computer hardware, and in some situations may take a significant amount of time and effort.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
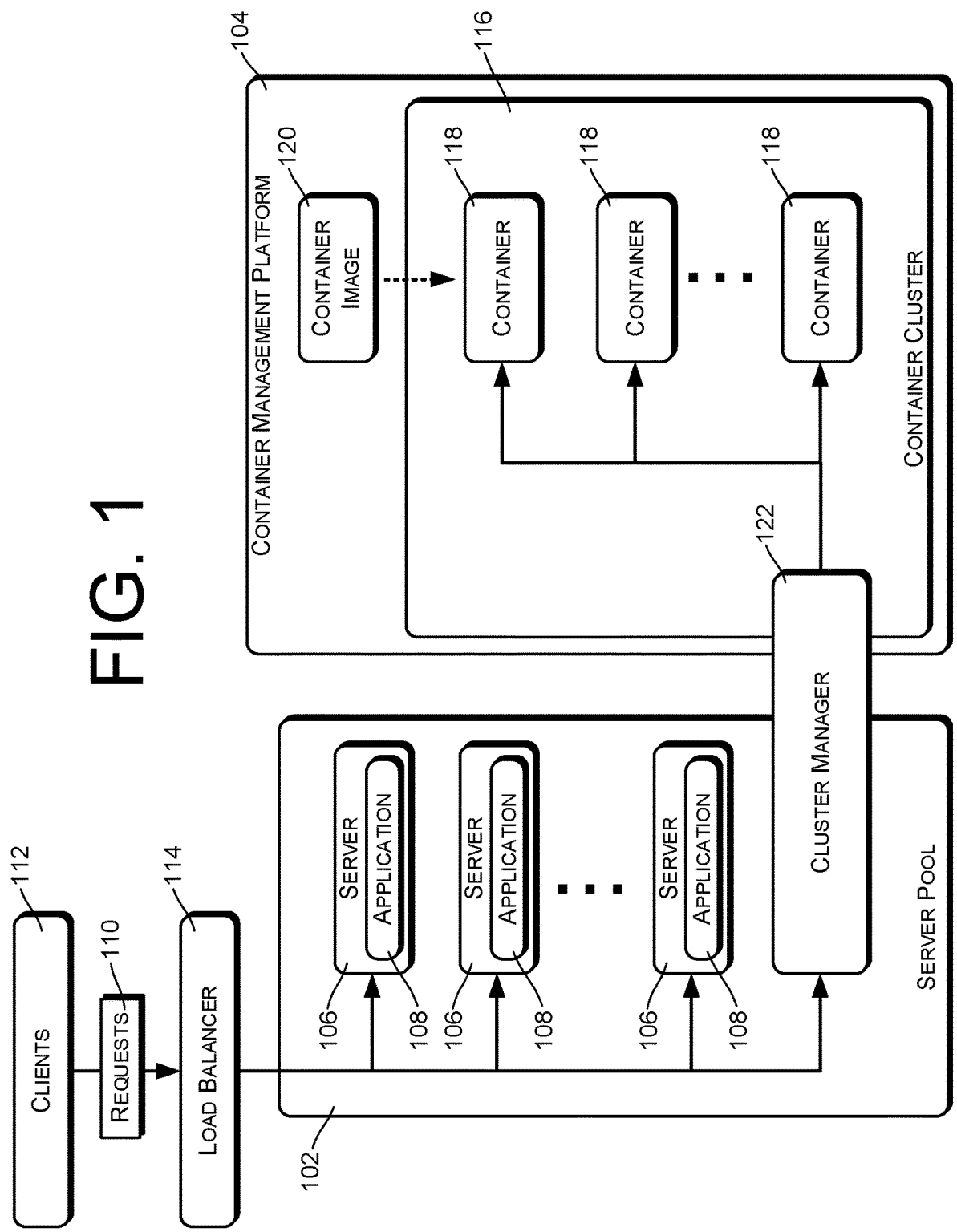
FIG. 1 is a block diagram illustrating a server pool and a container environment, in a configuration that allows a network service to gradually migrate its supporting software from the server pool to the container environment.

This disclosure describes, in part, techniques for migrating a network service from a multiple server infrastructure to a container-based platform where instances of the service's supporting network application can be created and destroyed dynamically in response to demand.

In accordance with embodiments described herein, the software application is configured to run in a container-based environment in which the application is packaged, instantiated, and executed as a software container. A container in this environment is a software package or image that can be deployed and executed by a physical or virtual server. Containers are dynamically created and destroyed in response to demand.

The software application is containerized by creating a container image that comprises the runtime components of the software application such as code files, libraries, environment variables, and any other dependencies. The container image is provided to a container management platform, which uses the container image to create multiple containers that are executed in parallel. The container management platform creates and destroys containers dynamically and automatically, in response to demand.

When migrating from an existing legacy server pool to a container environment, the load balancing router mentioned above may be configured to include the network address of a cluster of multiple containers that have been created based on the container image, and to include the container cluster when distributing network requests.

Initially, this may result in a relatively small number of requests being routed to the container cluster. If there are 99 servers, for example, with the container cluster being the $100^{th}$ member of the server pool, the container cluster might receive 1% of the requests. Over time, however, more and more of the servers may be removed from the server pool, resulting in increasingly more of the network requests being routed to the container cluster. As the container cluster receives more and more requests, it creates additional containers to meet the increasing demand.

The techniques described herein provide a convenient and easily implementable way to gradually shift a network service workload from a legacy infrastructure, based on physical or virtual server computers, to a container-based infrastructure in which an application may be dynamically and automatically scaled to meet demand. The gradual migration improves the reliability of a network system during the migration. Furthermore, the described techniques allow the migration to be completed with no interruption in service, thereby protecting the use experience. In addition, the automatic scaling provided by the container-based infrastructure allows a the service to reliably adapt to increasing demand, in a way that is much more efficient than adding physical server computers.

The described techniques may be useful when testing, for example, without committing to a full transfer of responsibilities from the legacy system to the container-based system. In addition, the techniques provide a convenient way to direct a specific percentage of the incoming requests to the container-based system, by appropriately specifying the number of computer servers that remain as members of the server pool.

FIG. 1 illustrates an example embodiment for migrating a software application from a legacy server pool 102 to a container management platform 104 in which application instances are embodied as containers that are automatically created and destroyed in response to network demand.

The legacy server pool 102 comprises multiple computer servers 106. Each computer server 106 comprises a host computer that runs an instance of a software application 108. The server pool 102 may comprise what is sometimes referred to as server farm, in which multiple physical application servers, each with its own operating system, are configured to simultaneously execute the software application 108 and respond to network requests 110 received from clients 112.

In some cases, the computer servers of the server pool 102 may support virtualization. That is, each computer server 106 may be configured to instantiate multiple virtual machines, each of which is then configured to execute the network application 108. Accordingly, each computer server 106 of FIG. 1 may in practice comprise multiple virtual computer servers. In some cases, each computer server 106 of FIG. 1 may represent a virtual computer server.

The software application 108 may comprise existing software that has been created and deployed to provide a service to the clients 112. For example, the software application 108 may support a website. As other examples, the software application 108 may provide or support services such as an email service, an accounting service, a commerce service, a communication service, etc. The software application 108 may be referred to at times as a web application, a network application, or an Internet application.

The container management platform 104 comprises a computer service, which may be implemented by one or more computers, that automates the creation, removal, execution, and scaling of containers. The container management platform may also be referred to as a container orchestration engine. As an example, "Kubernetes" is popular open source container management platform that is offered by various cloud services and that may also be implemented using in-house hardware. A "container" in this environment is a self-contained unit of code and data that can be deployed for operation under a computer operating system. A cluster of multiple containers can be executed on a single computer and under a single operating system. An executing container shares operating system resources, such as processor resources and memory resources, with multiple other containers. Thus, a single physical or virtual computer and its operating system can run multiple containers.

As illustrated in FIG. 1, the network requests 110 are sent from the clients 112 and are received by a load balancer 114 that is associated with the legacy server pool 102. Communications between the clients 112, the load balancer 114, and the computer servers 106 may use a local area network (LAN), a wide-area network (WAN) such as the Internet, or any other type of data communication capabilities, including wireless communication capabilities. The communications may use any of various types of standardized communication protocols and interfaces. For example, the software application 108 may be configured to support Representational State Transfer (REST) application programming interfaces (APIs). As another example, the software application 108 may be configured to support Simple Object Access Protocol (SOAP) APIs.

In some implementations, the load balancer 114 and the computer servers 106 may be collocated, such as within a room, building, or data center. In other implementations, the computer servers 106 of the legacy server pool 102 may include servers at multiple physical locations.

The load balancer 114 receives the network requests 110, which as mentioned above may comprise REST requests and/or SOAP requests, and distributes the requests 110 across the members of the server pool 102. When a new member (e.g., a new computer server 106) is added to the server pool 102, the load balancer 114 automatically, without operator intervention, begins sending a portion of the received network requests 110 to the new member. When a member goes down or is removed from the server pool 102, the load balancer 114 automatically, without operator intervention, distributes the traffic that would have otherwise been distributed to that member to remaining members of the server pool 102.

When the legacy server pool 102 and the software application 108 are used to support a network service, the demand for that network service may increase over time. That is, the number of network requests 110 received from the clients 112, or the rate at which the requests 110 are received, may increase over time. In response to increasing demand such as this, additional computer servers 106 may be added to the server pool 102. Any added computer server 106 is configured to run the software application 108 and is then connected to a common communication network with the other computer servers 106. The load balancer 114 is configured to include the newly added computer server 106 in the distribution of received network requests 110. Configuring the load balancer 114 may comprise, for example, specifying the network Internet Protocol (IP) address of the new computer server 106.

Upon receiving a network request 110 for an operation, an instance of the software application 108 performs the requested operation and/or returns any requested or resulting information to the requesting client 112.

The client requests 110 are typically received via the public Internet. However, the legacy server pool 102 may alternatively be configured to provide private or in-house services, and in this case the client requests 110 may be received over a private network or a private portion of a network. Client requests in some cases may be received via encrypted communication tunnels that are implemented through the Internet. Encrypted communication tunnels such as this may be referred to as Virtual Private Networks (VPNs).

In the setting of FIG. 1, it is desired to gradually move support for the software application 108 from the legacy server pool 102 to a container cluster 116 of the container management platform 104. That is, a given percentage of received requests 110 are to be routed to the container cluster 116 rather than to the existing computer servers 106 of the legacy server pool 102. Over time, a greater and greater percentage of the received requests 110 are to be routed to the container cluster 116. Eventually, all of the received requests 110 are to be routed to the container cluster 116.

The container cluster 116 is configured to replicate the functionality of the software application 108. The container cluster has multiple containers 118 that run in parallel to respond to process and respond to any received network requests 110. Each container 118 comprises an executing instance of the software application 108, that has been created using container-based techniques.

In the described embodiment, the software application 108 is containerized to create a container image 120. The container image 120 comprises the code, resources, and other dependencies of the software application 108. The container management platform 104 uses the container image 120 to create the individual containers 118.

A cluster manager 122 is associated with the container cluster 116. The cluster manager 122 is configured to receive network requests 110 and to distribute the received requests 110 to the containers 118 of the container cluster 116. The cluster manager 122 is configured to dynamically and automatically, without human intervention, replicate the container image 120 and add additional containers 118 to the container cluster 116 in response to receiving increasing numbers of requests 110.

The cluster manager 122 provides an API interface, at a known network IP address, through which the requests 110 may be received. The cluster manager 122 provides load balancing functionality, so that requests received by the cluster manager 122 are distributed across the multiple containers 118.

The load balancer 114 of the legacy server pool 102 is configured to treat the cluster manager 122 as a member of the legacy server pool 102 so that the cluster manager 122 receives a portion of the requests 110. In some implementations, the load balancer 114 may be configured by specifying the network IP address of the cluster manager 122. Configured in this manner, the load balancer 114 will distribute the requests 110 roughly equally between the server pool members, which now include the servers 106 and the cluster manager 122. Any requests received by the cluster manager 122 will be further distributed to the containers 118.

A software developer or tester can control the percentage of the requests 110 that are distributed to the container cluster 116 by controlling the number of the computer servers 106 that remain in the legacy server pool 102. Assuming there are 100 computer servers 106, for example, each of the computer servers 106 will receive approximately 1% of the requests 110. After configuring the cluster manager 122 as a member of the server pool 102, however, the developer or tester can remove one of the computer servers 106 from the server pool, so that the cluster manager 122 and each of remaining computer servers 106 will similarly receive 1% of the requests 110. A higher and higher percentage of the requests can be directed to the cluster manager 122 and the container cluster 116 by gradually removing additional computer servers 106 from the legacy server pool 102. Removing a computer server 106 from the legacy server pool 102 may in some implementations comprise removing the IP address of the server from the configuration of the load balancer 114.

Generally, the container cluster 116 will receive a fraction x of the requests 110, where x is approximately equal to the inverse of k+1, and where k is the number of computer servers 106 that are currently members of the legacy server pool 102.

As more and more of the requests 110 are routed by the load balancer 114 to the container cluster 116, the cluster manager 122 may create additional containers 118 to handle this increasing demand. In the described implementation, this happens automatically, without operator intervention.

Eventually, all of the computer servers 106 will have been removed from the server pool 102 so that the cluster manager 122 is the only member of the server pool 102. At this point, all the requests 110 may be sent directly to the cluster manager 122, bypassing the load balancer 114, and the legacy system can be retired.

Figure 2:
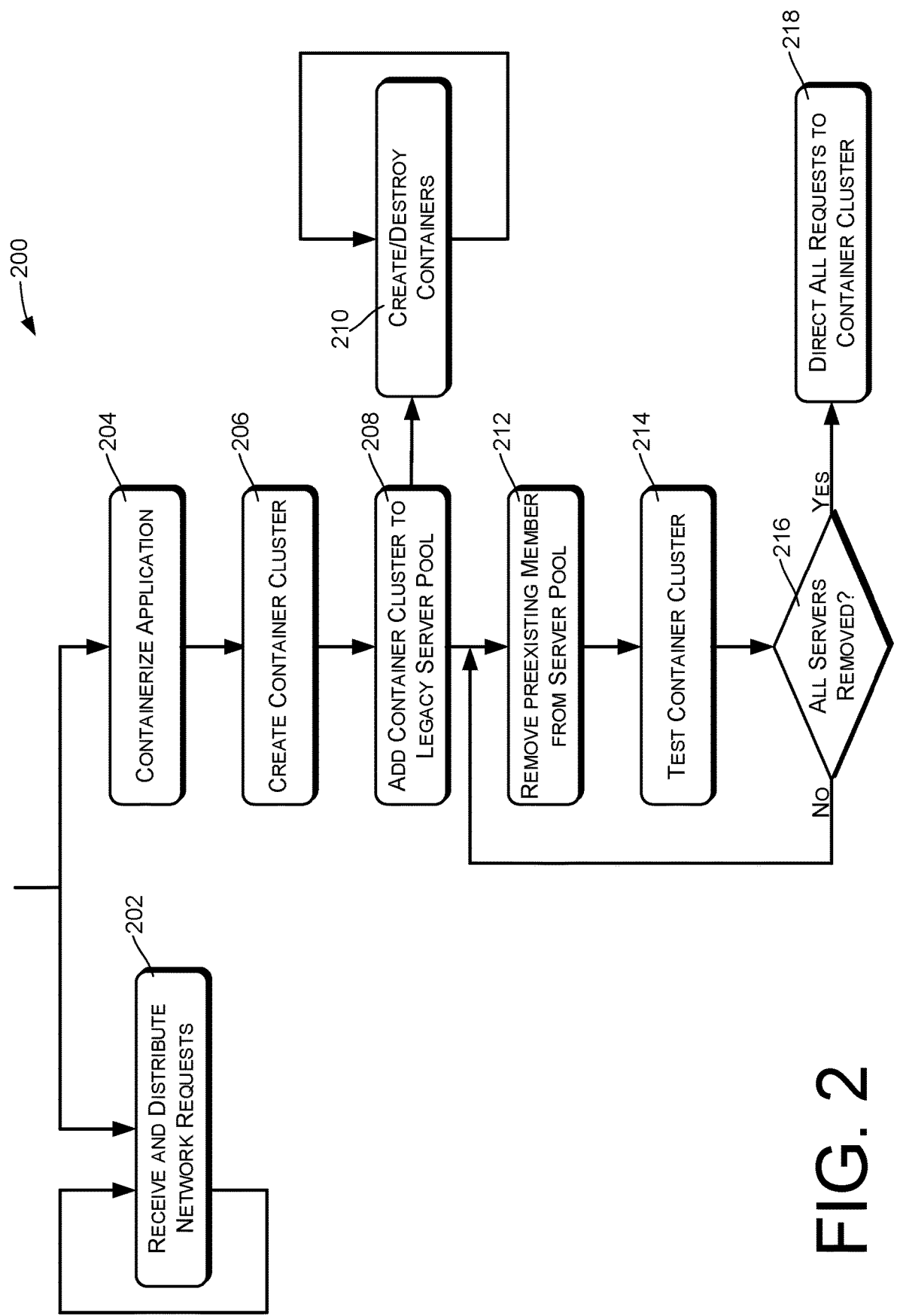
FIG. 2 is a flow diagram illustrating an example method of migrating a software application from a server pool to a container environment.

FIG. 2 illustrates an example method 200 for migrating a software application to a container-based runtime platform such as the container management platform 104. The method 200 will be described in the context discussed above with reference to FIG. 1, although the method 200 may also be used with other systems and configurations.

As already discussed, multiple members of an existing, legacy server pool 102 are configured to execute a software application 108. The members include preexisting members, which may comprise application servers, such as the computer servers 106, that execute instances of the software application 108. The software application 108 is configured to receive and process network requests 110.

An action 202, performed in the described embodiment by a router, comprises receiving incoming requests 110, wherein the requests 110 are for operations to be performed. The action 202 further comprises routing each of the incoming requests 110 to a member of the server pool 102.

In the described embodiment, the router is implemented as a load balancer 114. The load balancer 114 performs load balancing among the members of the server pool 102. More specifically, the load balancer 114 distributes incoming requests 110 in a round-robin fashion so that the requests 110 are distributed approximately equally across the members of the server pool 102.

The action 202 is performed repeatedly as new requests are received. The action 202 is performed in parallel with the remaining actions of FIG. 2 that are described below.

An action 204 comprises containerizing the software application 108 to execute on a container-based runtime platform, such as the container management platform 104, as a replicable software container. Containerizing the software application 108 may comprise creating a container image 120 that comprises the software application 108 and its dependencies such as libraries and environment variables.

The container management platform 104 is configured to dynamically create and execute individual containers 118, based on the container image 120, in response to receiving increasing numbers of the requests 110. The container management platform 104 may also remove individual containers 118 in response to receiving decreasing numbers of requests.

An action 206 comprises creating a container cluster 116, which comprises one or more executing containers 118 that have been created from the container image 120 to perform the operations requested by the incoming requests. The action 206 is performed by or in conjunction with the container management platform 104.

An action 208 comprises adding the container cluster 116 as an additional member of the server pool 102 so that the container cluster 116 will receive a portion of the incoming requests 110 from the load balancer 114. In the described embodiment, the action 208 is performed by adding an interface node of the container management platform 104 to the members of the server pool 102, so that the container cluster 116 becomes an additional member of the server pool 102.

In FIG. 1, the cluster manager 122 acts as the interface node. The cluster manager 122 is configured to distribute the received portion of the incoming requests 110 to the containers 118 of the container cluster 116. The distribution may be performed such that requests are distributed evenly across the containers 118.

An action 210 comprises dynamically scaling the container cluster 116 in response to varying request demand. The action 210 may be performed by the container management platform 104. The action 210 may comprise dynamically replicating the container image 120, in response to a higher rate of requests being received by the cluster manager 122, to create additional containers 118. The action 210 may also comprise dynamically removing container images 120 in response to a lower rate of requests being received by the cluster manager 122.

The action 210 is performed repeatedly, in parallel with the remaining actions of FIG. 2 that are described below. The action 210 is performed automatically, without operator intervention, under the management of the container management platform 104 and/or the cluster manager 122.

An action 212, performed after adding the container cluster to the server pool 102, comprises removing at least one of the preexisting members from the server pool 102. In the described embodiment, the action 212 may comprise removing at least one of the servers 106 from the server pool 102. In response to removing one or more preexisting members, the load balancer 114 automatically routes proportionally more of the incoming requests 110 to the container cluster 116.

An action 214 comprises testing the container cluster 116 to confirm that it correctly performs requested operations and that it scales appropriately in response to increased request rates. Note that testing such as this may be performed at various places in the method 200, in addition to after removing one or more of the servers 106. For example, testing may be performed prior to the first removal of any of the servers 106.

After the removal 212 and testing 214, an action 216 comprises determining whether all of the preexisting members (i.e., all of the computer servers 106) of the server pool 102 have been removed. If not all of the preexisting members have been removed, the actions 212 and 214 are repeated to remove one or more additional preexisting members from the server pool and to again test the response of the container cluster 116 to the resulting increased number of received requests.

The actions 212, 214, and 216 result in a process of successively and incrementally removing preexisting members of the server pool 102, over a time period, to distribute increasingly more of the incoming requests 110 to the container cluster 116. The time period may be great enough to allow testing after each preexisting member is removed. For example, the time period may be an hour, a day, a week, etc.

As an example of the actions 212, 214, and 216, at least one of the preexisting members may be removed from the server pool at a first time. In response to removing a preexisting member, the load balancer routes proportionally more of the incoming requests to the cluster manager 122 of the container cluster 116 for distribution to the containers 118 of the container cluster 116.

At a second, later time, at least another of the preexisting members may be removed to route additional ones of the incoming requests 110 to the cluster manager 122 of the container cluster 116 for distribution to the containers 118.

In the time period between the first time and the second time, the action 214 may be performed by testing an individual container 118 of the container cluster 116 and/or testing the performance of the container cluster 116 as a whole.

The second time may be significantly later than the first time to allow sufficient testing. For example, the second time may be later than the first time by at least an hour, a day, a week, or any other length of time that allows an operator to assess the operation of the container cluster as its processing load is increased.

Performed in this manner, the actions 212, 214, and 216 allow an operator or developer to incrementally, over time, reduce the number of preexisting members that are in the server pool and to thereby gradually shift responsibility for incoming requests to the container management platform 104 and the container cluster 116. As the preexisting members are removed from the server pool 102, an incrementally increasing percentage of received requests are routed to the container cluster 116, and the operation of the container cluster 116 can be observed and/or tested after each removal.

In some situations, a developer or operator may desire that a specified percentage of incoming requests 110 be forwarded to the container cluster 116 for testing the containers 118 of the container cluster 116. In these situations, the developer or operator may determine a number of the preexisting members to remove based at least in part on the specified percentage. For example, if 10 percent of incoming requests are to be routed to the container cluster 116, the developer or operator might remove all but nine of the preexisting members, leaving the container cluster as the 10th member of the server pool 102.

Returning to the action 216, if all the preexisting members have been removed, an action 218 is performed of directing all of the requests 110 to the container cluster 116. At this point, the load balancer can be bypassed, and requests can be routed directly to the container cluster 116.

Figure 3:
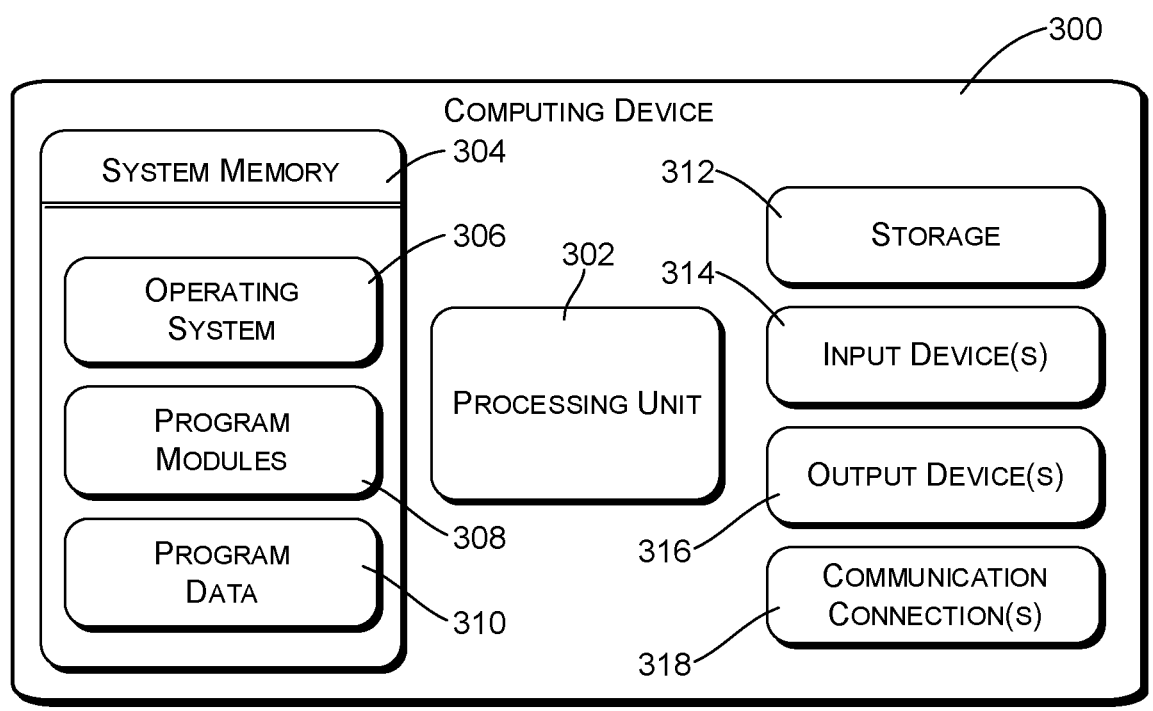
FIG. 3 is a block diagram of an example computing device that may be configured in accordance with the described techniques.

FIG. 3 is a block diagram of an illustrative computing device 300 such as may be used to implement various of the components described above. Generally, one or more computing devices 300 may be used to implement any of the components and/or functionality of the preceding FIGS. 1-2, such as the servers 106 and the clients 112. One or more computing devices 300 may also be used to implement the container management platform 104.

In various embodiments, the computing device 300 may include at least one processing unit 302 and system memory 304. Depending on the exact configuration and type of computing device, the system memory 304 may be volatile (such as RAM), non-volatile (such as ROM, flash memory, etc.) or some combination of the two. The system memory 304 may include an operating system 306, one or more program modules 308, and may include program data 310.

The computing device 300 may also include additional data storage devices (removable and/or non-removable) such as, for example, magnetic disks, optical disks, or tape. Such additional storage devices are illustrated in FIG. 3 as storage 312.

Non-transitory computer storage media of the computing device 300 may include volatile and nonvolatile, removable and non-removable media, implemented in any method or technology for storage of information, such as computer readable instructions, data structures, program modules, or other data. The system memory 304 and storage 312 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 300. Any such non-transitory computer-readable storage media may be part of the computing device 300.

In various embodiments, any or all of the system memory 304 and storage 312 may store programming instructions which, when executed, implement some or all of the function functionality described above. For example, the system memory and/or storage memory 312 may store software that performs container management for implementation of the container management platform 104.

The computing device 300 may also have input device(s) 314 such as a keyboard, a mouse, a touch-sensitive display, voice input device, etc. Output device(s) 316 such as a display, speakers, a printer, etc. may also be included. The computing device 300 may also contain communication connections 318 that allow the device to communicate with other computing devices.

Although features and/or methodological acts are described above, it is to be understood that the appended claims are not necessarily limited to those features or acts. Rather, the features and acts described above are disclosed as example forms of implementing the claims.

The invention claimed is:

1. A method for migrating a software application to a container-based runtime platform, the method comprising:
distributing, by a network load balancer associated with a server pool, incoming requests for operations among members of a server pool, wherein the members include a plurality of preexisting server computers that execute server instances of the software application to perform the operations in response to the incoming requests;

containerizing the software application to execute on the container-based runtime platform as a replicable software container;

adding a cluster manager, associated with a container cluster in the container-based runtime platform, as a member of the server pool, wherein the cluster manager is configured to:
  dynamically manage a number of container instances of the software application, created by replicating the replicable software container, in the container cluster;
  receive a portion of the incoming requests from the network load balancer; and
  distribute the portion of the incoming requests among the container instances in the container cluster;

incrementally removing, over a period of time, individual preexisting server computers from the server pool, wherein removing an individual preexisting server computer from the server pool causes the network load balancer to increase the portion of the incoming requests distributed by the network load balancer to the cluster manager;

determining that the plurality of preexisting server computers has been removed from the server pool; and bypassing the network load balancer in response to determining that the plurality of preexisting server computers has been removed from the server pool, wherein bypassing the network load balancer causes the cluster manager to receive the incoming requests and to distribute the incoming requests among the container instances in the container cluster.

2. The method of claim 1, wherein:
a particular percentage of the incoming requests is to be routed to the cluster manager for testing of the container cluster, and
the incrementally removing comprises removing a particular number of the preexisting server computers from the server pool, wherein the particular number is determined based at least in part on the particular percentage.

3. The method of claim 1, wherein the incrementally removing comprises removing the individual preexisting server computers at times spaced apart by at least a day.

4. The method of claim 1, wherein the incrementally removing comprises:
removing a first preexisting server computer from the server pool;
testing an individual container instance in the container cluster to confirm an operation performed by the individual container instance; and
subsequent to the testing, removing a second preexisting server computer from the server pool.

5. The method of claim 1, wherein:
the network load balancer is configured with network addresses of the members of the server pool, and
the incrementally removing comprises incrementally removing the network addresses associated with the individual preexisting server computers from a configuration of the network load balancer.

6. The method of claim 1, wherein the cluster manager is configured to dynamically manage the container cluster by automatically, without human intervention, replicating the replicable software container to create additional container instances in the container cluster in response to an increase in a number of the incoming requests received by the cluster manager.

7. The method of claim 1, wherein the cluster manager is configured to dynamically manage the container cluster by deleting one or more of the container instances in the container cluster in response to a decrease in a number of the incoming requests received by the cluster manager.

8. The method of claim 1, wherein adding the cluster manager as the member of the server pool comprises adding a network address of the cluster manager to a configuration of the network load balancer.

9. The method of claim 8, wherein the network address of the cluster manager is associated with an application programming interface configured to receive the incoming requests.

10. One or more computing devices, comprising:
one or more processors; and
memory storing computer-executable instructions that, when executed by the one or more processors, cause the one or more processors to:
  distribute, via a load balancer associated with a server pool, incoming requests for operations among members of the server pool, wherein the members include a plurality of preexisting server computers that execute server instances of a software application to perform the operations in response to the incoming requests;
  containerize the software application to create a container image;
  add a cluster manager, associated with a container cluster, as a member of the server pool, wherein the cluster manager is configured to:
    dynamically manage a number of container instances of the software application, created by replicating the container image, in the container cluster;
    receive a portion of the incoming requests from the load balancer; and
    distribute the portion of the incoming requests among the container instances in the container cluster;
  incrementally remove, over a period of time, individual preexisting server computers from the server pool, wherein removal of an individual preexisting server computer from the server pool causes the load balancer to increase the portion of the incoming requests distributed by the load balancer to the cluster manager;
  determine that the plurality of preexisting server computers has been removed from the server pool; and
  bypass the load balancer in response to determining that the plurality of preexisting server computers has been removed from the server pool, wherein bypassing the load balancer causes the cluster manager to receive the incoming requests and to distribute the incoming requests among the container instances in the container cluster.

11. The one or more computing devices of claim 10, wherein the one or more processors incrementally remove the individual preexisting server computers by successively removing the preexisting server computers over a time period to distribute increasingly more of the incoming requests to the cluster manager.

12. The one or more computing devices of claim 11, wherein the time period is at least a day.

13. The one or more computing devices of claim 10, wherein the one or more processors incrementally remove the individual preexisting server computers by removing network addresses of the individual preexisting server computers from a configuration associated with the load balancer.

14. The one or more computing devices of claim 10, wherein the one or more processors incrementally remove the individual preexisting server computers by:
   removing a first preexisting server computer from the server pool;
   testing an individual container instance in the container cluster to confirm an operation performed by the individual container instance; and
   subsequent to the testing, removing a second preexisting server computer from the server pool.

15. The one or more computing devices of claim 10, wherein the cluster manager is added as the member of the server pool by adding a network address of the cluster manager to a configuration of the load balancer.

16. The one or more computing devices of claim 10, wherein the cluster manager is configured to dynamically increase or decrease the number of container instances in the container cluster in response to changes in a number of the incoming requests received by the cluster manager.

17. A method comprising:
   during a first period of time, distributing, by a network load balancer associated with a server pool, requests to perform operations among members of the server pool, wherein the server pool comprises:
      a plurality of preexisting members configured to execute server instances of a software application to perform the operations; and
      a cluster manager, associated with a container cluster, configured to:
         dynamically manage a number of container instances of the software application, created by replicating a container image of the software application, in the container cluster; and
         distribute a portion of the requests, received from the network load balancer, among the container instances in the container cluster;
   during a second period of time, incrementally reducing a number of preexisting members that are in the server pool, wherein incrementally reducing the number of preexisting members causes the network load balancer to increase the portion of the requests distributed to the cluster manager; and
   during a third period of time, in response to a determination that the plurality of preexisting members has been removed from the server pool, bypassing the network load balancer, wherein bypassing the network load balancer causes:
      the server pool to be retired; and
      the cluster manager to receive the requests and to distribute the requests among the container instances in the container cluster.

18. The method of claim 17, wherein individual preexisting members are successively removed from the server pool at times spaced apart by at least a threshold time period.

19. The method of claim 17, further comprising, during the second period of time:
   testing an individual container instance in the container cluster to confirm an operation performed by the individual container instance; and
   removing an individual preexisting member from the server pool in response to the testing.

20. The method of claim 17, wherein the cluster manager is configured to dynamically increase or decrease the number of container instances in the container cluster in response to changes in a number of the requests received by the cluster manager.

* * * * *